United States Patent
McAuliffe et al.

(10) Patent No.: US 6,603,618 B1
(45) Date of Patent: *Aug. 5, 2003

(54) METHOD AND SYSTEM FOR MONITORING AND ADJUSTING TAPE POSITION USING CONTROL DATA PACKETS

(75) Inventors: Richard McAuliffe, Boulder; Frederick G. Munro, Bloomfield; Paul Newsome, Boulder; Thomas E. Zaczek, Louisville, all of CO (US)

(73) Assignee: Exabyte Corporation, Boulder, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,030

(22) Filed: Nov. 16, 1998

(51) Int. Cl.⁷ .................................. G11B 5/09
(52) U.S. Cl. ...................... 360/51; 360/73.04; 360/72.1
(58) Field of Search .................... 360/51, 64, 72.1, 360/73.04, 74.01, 74.2, 74.3, 73.08

(56) References Cited

U.S. PATENT DOCUMENTS

| | | |
|---|---|---|
| 3,821,710 A | 6/1974 | Arciprete et al. |
| 3,962,727 A | 6/1976 | Kamimura et al. |
| 4,011,587 A | 3/1977 | Arter et al. |
| 4,099,211 A | 7/1978 | Hathaway |
| 4,106,065 A | 8/1978 | Ravizza |
| 4,125,881 A | 11/1978 | Eige et al. |
| 4,172,265 A | 10/1979 | Sakamoto et al. |
| 4,175,267 A | 11/1979 | Tachi |
| 4,215,377 A | 7/1980 | Norris |
| 4,257,075 A | 3/1981 | Wysocki et al. |
| 4,293,879 A | 10/1981 | Heitmann et al. |
| 4,357,639 A | 11/1982 | Hama et al. |
| 4,390,915 A | 6/1983 | Matsuyama |
| 4,394,694 A | 7/1983 | Ninomiya et al. |
| 4,404,605 A | 9/1983 | Sakamoto |
| 4,412,260 A | 10/1983 | Stricklin et al. |
| 4,420,778 A | 12/1983 | Sakamoto |
| 4,467,373 A | 8/1984 | Taylor et al. |
| 4,471,391 A | 9/1984 | Reagan |
| 4,484,236 A | 11/1984 | Wilkinson |
| 4,486,796 A | 12/1984 | Sakamoto |
| 4,491,886 A | 1/1985 | Saito et al. |

(List continued on next page.)

FOREIGN PATENT DOCUMENTS

| | | | |
|---|---|---|---|
| JP | 58208915 | 12/1983 | |
| JP | 60234278 | 11/1985 | |
| JP | 06334958 A | * 12/1994 | .......... H04N/5/783 |
| JP | 08227502 A | * 9/1996 | ............ G11B/5/09 |
| JP | 11016228 | 1/1999 | |

OTHER PUBLICATIONS

PIZZI, New Audio Recording Formats, Broadcast Engineering, Feb. 1993, paragraph. 60–63.

Sasake., T., Asltad, J., YOUNKER, M., The NT Digital Mcro Tape Recorder, Goddard Conference on Mass Storage Systems and Technologies, Sep. 22–24, 1992, paragraph. 143–157.

*Primary Examiner*—David Hudspeth
*Assistant Examiner*—Dan I. Davidson
(74) *Attorney, Agent, or Firm*—The Law Office of Jessica Costa; Jessica Costa

(57) ABSTRACT

A method and system for monitoring and/or adjusting the positioning of a magnetic tape using central control packets that are recorded to the tape is presented. Central control packets are used for adjusting the timing of the read head signal over the tape, adapting the reel count to that of the drive at the time the tape was recorded, and monitoring filemarks for logical tape positioning.

18 Claims, 4 Drawing Sheets

U.S. PATENT DOCUMENTS

| | | |
|---|---|---|
| 4,492,991 A | 1/1985 | Osada et al. |
| 4,544,967 A | 10/1985 | Louth |
| 4,554,598 A | 11/1985 | Tarbox et al. |
| 4,581,662 A | 4/1986 | Sato |
| 4,609,947 A | 9/1986 | Yamagiwa et al. |
| 4,614,991 A | 9/1986 | Murakami |
| 4,620,245 A | 10/1986 | Shimizu |
| 4,628,372 A | 12/1986 | Morisawa |
| 4,628,383 A | 12/1986 | Miyamoto |
| 4,636,873 A | 1/1987 | Eguchi |
| 4,637,023 A | 1/1987 | Lounsbury et al. |
| 4,641,210 A | 2/1987 | Ohyama |
| 4,642,714 A | 2/1987 | Miyamoto |
| 4,644,414 A | 2/1987 | Yamada et al. |
| 4,651,239 A | 3/1987 | Omori et al. |
| 4,654,731 A | 3/1987 | Froschl et al. |
| 4,663,673 A | 5/1987 | Doutsubo |
| 4,665,447 A | 5/1987 | Odaka |
| 4,677,504 A | 6/1987 | Yamazaki et al. |
| 4,680,654 A | 7/1987 | Shibuya |
| 4,682,247 A | 7/1987 | Doutsbo |
| 4,688,109 A | 8/1987 | Sangu |
| 4,703,373 A | 10/1987 | Oosaka |
| 4,714,971 A | 12/1987 | Sigiki et al. |
| 4,717,974 A | 1/1988 | Baumeister |
| 4,731,678 A | 3/1988 | Takeuchi |
| 4,737,865 A | 4/1988 | Murakami et al. |
| 4,739,420 A | 4/1988 | Odaka et al. |
| 4,758,904 A | 7/1988 | Takashashi et al. |
| 4,758,911 A | 7/1988 | Nakano et al. |
| 4,760,474 A | 7/1988 | Takimoto |
| 4,769,811 A | 9/1988 | Eckberg, Jr. et al. |
| 4,774,605 A | 9/1988 | Kato |
| 4,786,011 A | 11/1988 | Fujiwara et al. |
| 4,796,115 A | 1/1989 | Ohshima et al. |
| 4,799,221 A | 1/1989 | Fukami et al. |
| 4,802,172 A | 1/1989 | Fukami et al. |
| 4,812,924 A | 3/1989 | Fukami et al. |
| 4,821,129 A | 4/1989 | Culp |
| 4,835,628 A | 5/1989 | Hinz et al. |
| 4,843,495 A | 6/1989 | Georgis et al. |
| 4,845,577 A | 7/1989 | Georgis et al. |
| 4,897,739 A | 1/1990 | Hasegawa et al. |
| 4,918,546 A | 4/1990 | Saito |
| 4,930,027 A | 5/1990 | Steele et al. |
| 4,933,784 A | 6/1990 | Oldershaw et al. |
| 4,935,824 A | 6/1990 | Nakano et al. |
| 4,935,827 A | 6/1990 | Oldershaw et al. |
| 4,970,612 A | 11/1990 | Renders et al. |
| 4,977,469 A | 12/1990 | Yokozawa |
| 4,984,104 A | 1/1991 | Takahashi et al. |
| 5,003,411 A | 3/1991 | Nagahara et al. |
| 5,034,833 A | 7/1991 | Marlowe |
| 5,050,018 A | 9/1991 | Georgis et al. |
| 5,068,757 A | 11/1991 | Hughes et al. |
| 5,103,355 A | 4/1992 | Steele |
| 5,115,500 A | 5/1992 | Larsen |
| 5,142,422 A | 8/1992 | Zook et al. |
| 5,191,491 A | 3/1993 | Zweighaft |
| 5,251,077 A | 10/1993 | Saitoh |
| 5,262,905 A | 11/1993 | Takagi et al. |
| 5,309,300 A * | 5/1994 | Lee .......................... 360/74.2 |
| 5,327,305 A | 7/1994 | Thomas |
| 5,349,481 A | 9/1994 | Kauffman et al. |
| 5,410,435 A * | 4/1995 | Sakai et al. ................... 360/64 |
| 5,414,570 A | 5/1995 | Fry et al. |
| 5,535,068 A | 7/1996 | Hughes |
| 5,566,032 A | 10/1996 | Cleveland et al. |
| 5,602,694 A | 2/1997 | Miles et al. |
| 5,633,764 A | 5/1997 | Ohta |
| 5,781,688 A | 7/1998 | Seong |
| 5,796,536 A | 8/1998 | Sato et al. |
| 5,859,741 A * | 1/1999 | Nakagawara et al. .... 360/77.13 |
| 5,872,997 A | 2/1999 | Golson |
| 5,953,177 A | 9/1999 | Hughes |
| 6,381,706 B1 * | 4/2002 | Zaczek .......................... 714/5 |

* cited by examiner

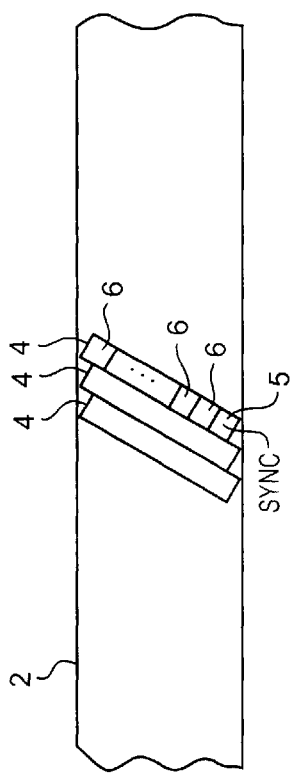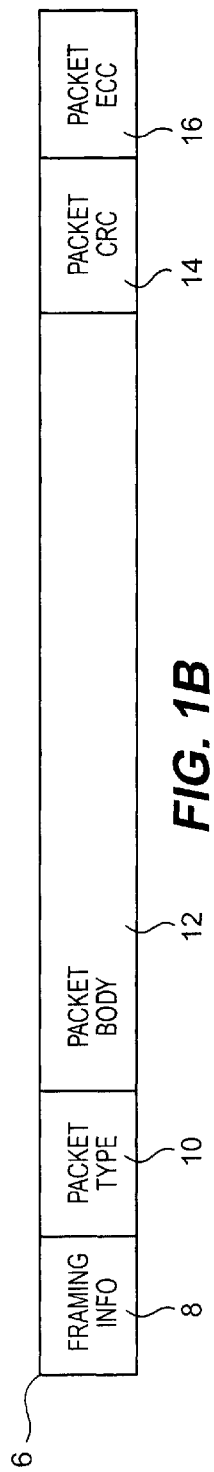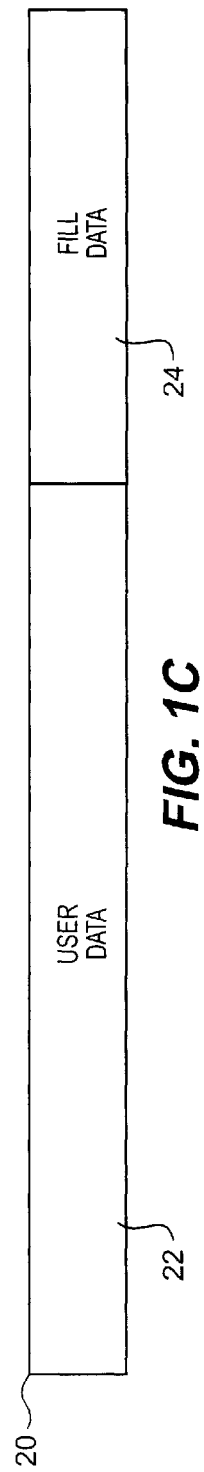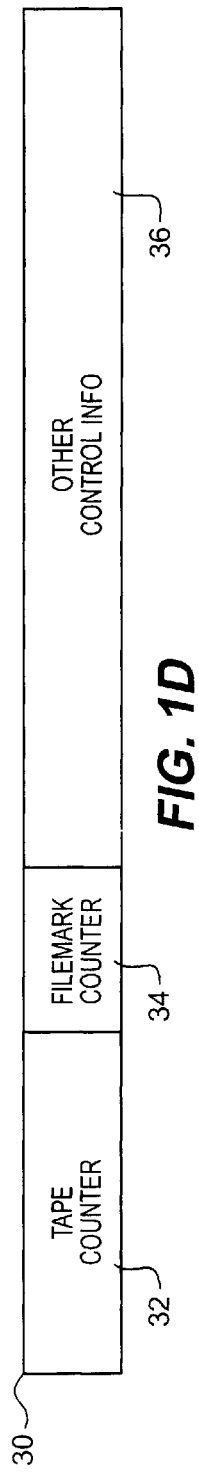

METHOD AND SYSTEM FOR MONITORING AND ADJUSTING TAPE POSITION USING CONTROL DATA PACKETS

RELATED PATENTS

The present invention is related to co-pending U.S. patent application entitled "Method And Apparatus For Logically Rejecting Previously Recorded Track Residue From Magnetic Media", invented by McAuliffe et al., and having a serial number of U.S. Ser. No. 09/192,794, filed concurrently herewith on Nov. 16, 1998, and co-pending U.S. patent application entitled "A Method Of Reacquiring Clock Synchronization On A Non-Tracking Helical Scan Tape Device", invented by Blatchley et al., and having a serial number of U.S. Ser. No. 09/192,808, filed concurrently herewith on Nov. 16, 1998, and co-pending U.S. patent application entitled "Rogue Packet Detection And Correction Method For Data Storage Device", invented by McAuliffe et al., and having a serial number of U.S. Ser. No. 09/192,809, filed concurrently herewith on Nov. 16, 1998, and co-pending U.S. patent application entitled "Variable Speed Recording Method and Apparatus for a Magnetic Tape Drive", invented by Beavers et al., and having a serial number of U.S. Ser. No. 09/176,079, filed on Oct. 20, 1998, and co-pending U.S. patent application entitled "Overscan Helical Scan Head for Non-Tracking Tap Subsystems Reading at up to 1×Speed and Method for Simulation of Same", invented by Blatchley et al., and having a serial number of U.S. Ser. No. 09/176,013, filed on Oct. 20, 1998, and co-pending U.S. patent application entitled "Fine Granularity Rewrite Method and Apparatus for Data Storage Device", invented by Zaczek, and having a serial number of U.S. Ser. No. 09/176,015, filed on Oct. 20, 1998, and co-pending U.S. patent application entitled "Multi-level Error Detection and Correction Technique for Data Storage Recording Device", invented by McAuliffe et al., and having a serial number of U.S. Ser. No. 09/176,014, filed on Oct. 20, 1998, all of which are commonly owned and all of which are hereby incorporated by reference.

FIELD OF THE INVENTION

The present invention pertains generally to magnetic tape drives, and more particularly to the use of central control packets for monitoring and adjusting tape positioning control parameters.

BACKGROUND OF THE INVENTION

Tape storage technology is routinely used for routine system back up and long-term data archiving. The successful recovery of data from a tape is highly dependent on a number of physical and logical tape positioning parameters. These include the timing of the read head signal over the tape, the linear positioning of the tape based on the reel tach counters, and logical filemark positioning parameters.

Using the methodology of conventional recording techniques, data is partitioned into packets which are recorded onto a magnetic tape along tracks. The drive mechanism and media tolerances are tightly controlled to maintain a very precise alignment between the path traced by the heads and the written tracks on a tape.

During data recovery, a read head passes over the tape and attempts to read all of the track packets in a single pass. In order to successfully recover all of the track packets, the read head must be enabled during the time it passes over the tracks. Generally the timing of the read head enable signal is calibrated using a known good tape during manufacture. The timing interval is stored in a non-volatile memory before it is shipped to the end user and is subsequently used by the drive as a fixed parameter. The inability to adjust the read head timing occasionally results in data recovery problems generally caused by variations in tape alignment among different tapes or by data interchange problems caused when a tape is written by one drive and another drive attempts to read it. If the read head timing of the different drives vary by much, the read head signal may not be enabled while it is over a portion of the tracks recorded by another drive, resulting in the inability to read a portion of every track. Accordingly, a need exists for a method for adaptively adjusting the read head timing signal in a tape drive to conform to the physical position of the tracks on the tape. The write enable signal is also adjusted to allow splicing with the same offset that is found on the tape.

Tape drive designers must also contend with another physical positioning parameter—namely, the reel tach counters for use in linear tape positioning. Conventional tape drives wind tape between two reels—a supply reel and a take-up reel. During forward tape motion, tape is pulled from the supply reel and wound around the take-up reel. During reverse tape motion, tape is pulled from the take-up reel and wound around the supply reel. Most tape drives includes a supply reel tachometer and a takeup reel tachometer. The reel tachometers each count a predetermined number of reel tachs per reel revolution. The rate at which one reel tach count changes is inversely proportional to the rate at which the other reel tach count changes. However, because the outer circumference of the supply and take-up reel varies as tape is transported from one reel to the other, no linear correlation exists between either reel tach count, taken alone, and the linear position of the tape. However, the sum, hereinafter "reel count", of the supply and takeup reel tach counts generate a roughly linear function. If the reel count consistently reflected a given value at a given linear position of the tape, it could be used as a coarse positioning tool for determining whether a known position on the tape, as reflected by a given reel count, is nearby and, when performing high-speed search operations, whether the speed of the tape should be increased, decreased, maintained, or stopped.

Depending on the speed at which the tape is wound around each of the reels, however, the reel count varies for any given linear position on tape. Thus, the reel count does not consistently reflect a given reel count value at a given linear position on the tape. For example, a high-speed tape transport, such as occurs during a rewind or a high-speed search, results in the tape being wound around the receiving reel at a looser winding tension than if it were being wound around the reel at a slower more-controlled speed, such as the normal 1× read or write speed. Accordingly, differing tape winding tensions result in differing outer circumference measurements of the tape around the reel for the same linear tape position. This affects the correlation of the reel tach count with the linear position of the tape since to reach the same linear position on tape takes fewer revolutions of the reel when the tape winding tension around the reel is lower than when the tension is higher. If the reel tach count reflects a given value when data is recorded at a given linear position on tape, the reel tach count is likely to reflect a different value when the same linear position of the tape is encountered during a later data recovery or search operation depending on the winding tension of the tape around the reel. Accordingly, a need exists for a method for providing consistent correlation between the reel tach count and the linear position of the tape.

Tape positioning parameters may also be related to logical positioning. Increased data recovery rates may often be improved by decreasing the amount of time it takes to search for a particular position on tape. Track packets generally comprise either user data (hereinafter termed a "data packet") or system control information (hereinafter termed a "control packet"). Control packets contain information relating to the position of the media (such as beginning- or end-of-media), the beginning and or ending of files or data (e.g., filemarks, tapemarks, end-of-data marks), global address information (e.g., the global segment address of data surrounding the control packet), and system information (such as device control codes). Control packets are generated during recording sessions by the write logic of the drive. Control packets that are recovered from tape during a data recovery session are processed by the read logic of the drive to determine physical and logical tape positioning information and other information pertaining to the data itself.

Global tape positioning is often accomplished through the use of filemarks. Filemarks are used to delineate different sets of data that may or may not be recorded during different recording sessions. Filemarks are typically recorded as special filemark control packets along one or a small number of tracks. Searching is accomplished by searching for the special filemark control packets. However, because filemark control packets are recorded only over one or a small number of tracks, the filemark control packets often go undetected by the read head during a high-speed search operation. If a filemark is missed, the high-speed search algorithm will not know it until a subsequent filemark or the end-of-tape is detected. Thus, a search may require several passes over the same portion of tape in either direction before the desired position (i.e., beginning of file) is located. Accordingly, a need exists for a more efficient method for detecting the number of the filemark at a given position on tape during high-speed search operations.

BRIEF DESCRIPTION OF THE DRAWING

The invention will be better understood from a reading of the following detailed description taken in conjunction with the drawing in which like reference designators are used to designate like elements, and in which:

FIG. 1(a) is a side view of a portion of a magnetic tape illustrating an example set of tracks recorded onto a magnetic tape;

FIG. 1(b) illustrates one embodiment of the contents of a track packet in accordance with the invention;

FIG. 1(c) illustrates one embodiment of the contents of packet body 12 for a data packet;

FIG. 1(d) illustrates one embodiment of the contents of packet body for a central control packet defined in accordance with the present invention;

DETAILED DESCRIPTION

Figure 2:
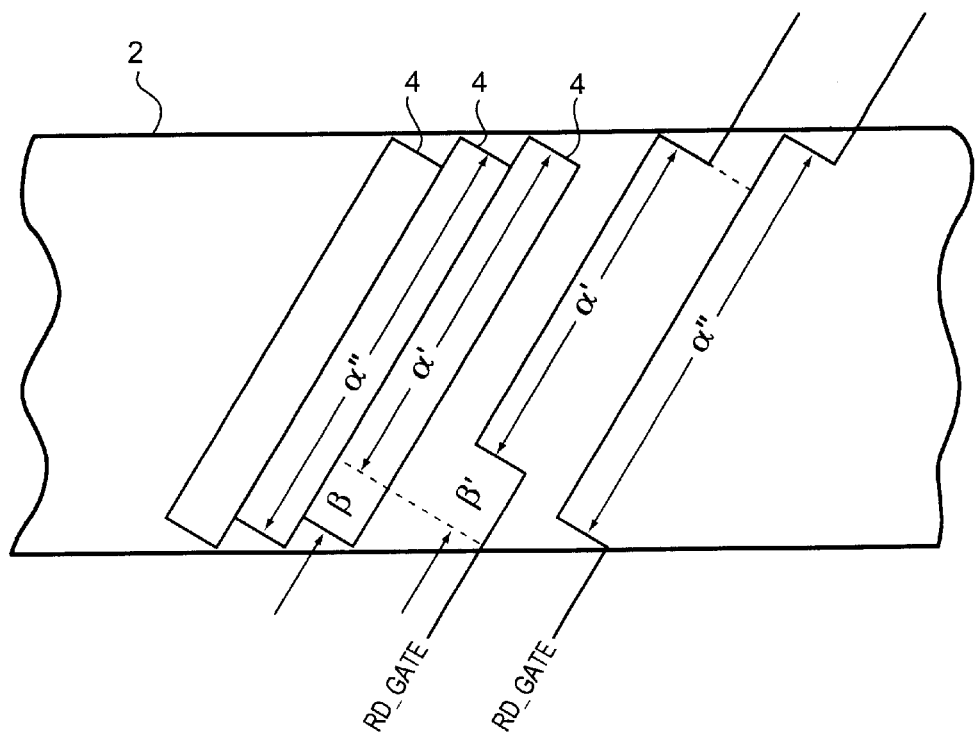
FIG. 2 is a diagram illustrating the use of central control packets in the present invention.

A novel method and system for monitoring and/or adjusting the positioning of a magnetic tape using central control packets that are recorded to the tape is described in detail hereinafter. The invention is described in the context of a magnetic tape drive system for purposes of illustration only and not by way of limitation. Those skilled in the art will appreciate that the principles of the invention may be extended to other data recording/recovery systems in which data is recorded along tracks.

In accordance with the invention, central control packets are used for adjusting the timing of the read and write head signals over the tape, adapting the reel count to that of the drive at the time the tape was recorded, and monitoring filemarks for logical tape positioning.

In the recording of user data onto a magnetic medium such as a magnetic tape, data is partitioned into segments of data which are formatted into packets and then recorded onto the medium along tracks. FIG. 1(a) is a side view of a portion of a magnetic tape illustrating a set of tracks 4 recorded onto a magnetic tape 2. In the illustrative embodiment, tracks 4 are recorded at an angle in a helical pattern by a helical scan tape drive. As illustrated, each track 4 includes synchronization information 5 recorded at the beginning of each track for use by read detection circuitry in detecting the beginning of a track. Each track 4 includes multiple track packets 6. FIG. 1(b) illustrates one embodiment of the contents of a track packet 6. In the illustrative embodiment, each track packet 6 is fixed in size and includes framing information 8, a packet type field 10, a packet body 12, a packet CRC field 14, and a packet ECC field 16. Framing information 8 is used by the read circuitry to detect the beginning of a track packet. Packet type 10 is used to indicate information pertaining to the contents of packet body 12. The meaning and definition of the contents of packet body 12 may vary depending on the contents of packet type field 10, as discussed hereinafter. Packet CRC field 14 contains a cyclical redundancy code generated over the contents of the packet type field 10 and packet body 12, and is used during the recovery of data to detect whether the packet 6 contains any errors. Packet ECC field 16 contains an error correction code (e.g., a Reed-Solomon code) generated over the contents of packet type field 10, packet body 12, and packet CRC field 14. Packet ECC field 16 is used during the recovery of data to detect and correct packet errors.

As previously discussed, the contents and format definition of packet body 12 may vary depending on the type of the packet 6 as indicated by the packet type field 10. Packets 6 that are used to store user data are herein referred to as "data packets" 20. FIG.1(c) illustrates one embodiment of the contents of packet body 12 for a data packet 20. As illustrated, packet body 12 for a data packet 20 generally contains all user data 22. Occasionally, for example in the last data packet 20 of a logical block segment, a data packet 20 may be padded out with fill data 24 in order to maintain the fixed packet size. Fill data 24 is "don't care" packet bits are set to in order to ensure proper detection and correction of packet errors by the packet-level CRC and ECC generators during data recovery.

FIG. 1(d) illustrates one embodiment of the contents of packet body 12 for a central control packet 30 defined in accordance with the present invention. In the preferred embodiment, central control packet 30 includes a tape count field 32 and a filemark count field 34. The use of tape count field 32 and filemark count field 34 are discussed presently. Central control packet 30 may or may not include other control information 36 in its packet body 12, and, if the central control packet 30 is used only for calibrating read head timing, as discussed hereinafter, it may not even include tape count field 32 and/or filemark count field 34.

In a first application of the invention, central control packets are used for adaptively adjusting the timing of the head signal. FIG. 2 is a diagram illustrating the placement of central control packets 30 on tape 2 for adjusting the timing of the read head signal in the present invention. As illustrated, the central control packet 30 of the invention is recorded at the same relative position on each track 4 on tape 2. In the preferred embodiment, the central control packet 30 is always recorded at the center of every track 4.

The placement of a central control packet 30 in the same relative position on tape allows for the detection of a central control packet 30 at high tape transport speeds for at least a portion of the tracks 4. To read the central control packets 30 at high speed, the drum speed may be increased or alternatively the channel clock rate may be increased, in order to pass the read head across packet at the same effective speed that it was originally recorded at. Those skilled in the art will appreciate that due to the higher tape transport speed, a central control packet 30 will only be detected once every few drum revolutions (i.e., once every several tracks 4). The frequency at which a central control packet 30 will be detected is increased the more read heads a drum has.

Figure 3A:
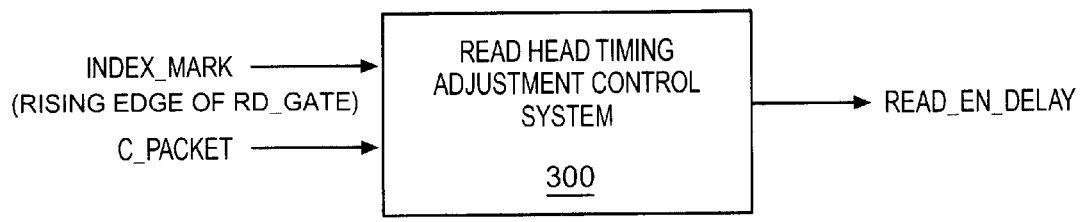
FIG. 3(a) is a block diagram of an adjustable head timing control system.
Figure 3B:
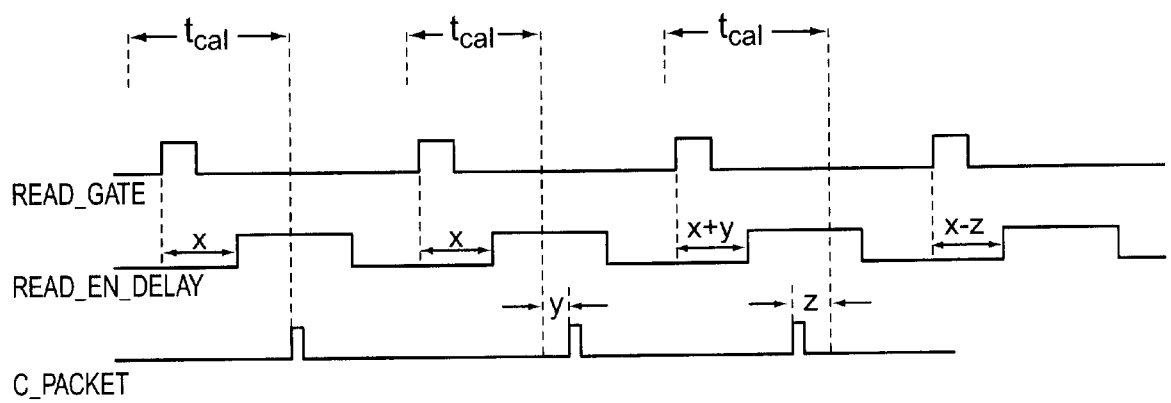
FIG. 3(b) is a timing diagram illustrating the operation of the read head timing adjustment control system of FIG. 3(a)
Figure 3C:
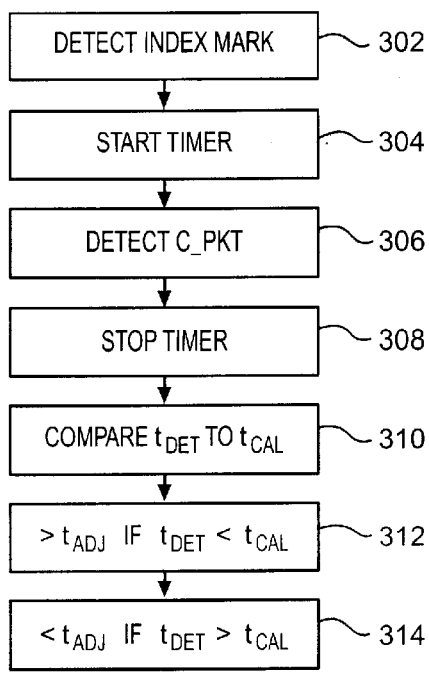
FIG. 3(c) is a flowchart of one embodiment of a method for adjusting the timing of the read head.

An adjustable read head timing adjustment control system (not shown in FIG. 2, but described in FIGS. 3(a), 3(b) and 3(c)) monitors the relative position of detected central control packets 30 and adjusts the timing of the read heads such that they scan the entire width of the tape 2. For example, in the illustrative embodiment the read heads are positioned over the tape 2 during half of every drum revolution. Thus, referring back to FIG. 2, if the timing of the read head over the tape is either early or late, the read head will scan only a portion of the entire track during every revolution of the drum, as illustrated at α', and a portion β' of each track 4 will not be read.

The present invention solves this problem by recording a central control packet 30 at the same relative position on each track 4, and employing read head timing adjustment control system during a data recovery session. During the data recovery session, the read head timing adjustment control system, for example 300 in FIG. 3(a), measures the relative position of the central control packet 30 on each track 4 with respect to a reference index mark INDEX_MARK and compares is to a reference position that is calibrated at the factory. In the preferred embodiment the reference index mark is the rising edge of a drum revolution signal RD_GATE generated by a magnet on bottom of the drum that pulses once per drum revolution, thereby serving as an absolute time reference. In the illustrative embodiment, the reference position is the amount of time that should pass between the detection of the reference index mark INDEX_MARK and the detection of the central control packet 30 as represented by time $t_{CAL}$. Time $t_{CAL}$ is calibrated during manufacturing and stored in non-volatile memory. The relative position is measured by the amount of time $t_{DET}$ that passes between the detection of the reference index mark INDEX_MARK and the detection of the central control packet 30 is indicated by signal C_PACKET. Based on the relative position on a track 4 of the central control packet 30 as detected by the read logic and indicated via a central control packet detect signal C_PACKET, adjustable head timing control system 300 adjusts the timing of a read enable delay signal RD_EN_DELAY in realtime to synchronize the position of the read head over the entire physical expanse of a track 4 on the tape, as illustrated at α" in FIG. 2. The read head enable delay signal RD_EN_DELAY may be used directly to enable the read head to read data, or alternatively may be used indirectly to adjust the timing of a separate read head enable signal (not shown). The read gate enable delay signal is adjusted based on the difference in time $t_{ADJ}$ between $t_{DET}$ and $t_{CAL}$.

FIG. 3(b) is a timing diagram illustrating the operation of the read head timing adjustment control system 300 of FIG. 3(a). As illustrated, if the time $t_{DET}$ at which central control packet detect signal C_PACKET is detected after detection of the index mark signal INDEX_MARK is greater than the calibrated time $t_{CAL}$, the read enable delay signal RD_EN_DELAY is adjusted by a positive amount of time $t_{ADJ}$, shown as "x+y"; whereas if the time $t_{DET}$ at which central control packet detect signal C_PACKET is detected after detection of the index mark signal INDEX_MARK is less than the calibrated time $t_{CAL}$, the read enable delay signal RD_EN_DELAY is adjusted by a negative amount of time $t_{ADJ}$, shown as "x−z", where x is the standard amount of time delay $t_{ADJ}$. The read enable signal READ_GATE is always asserted immediately after the read enable delay signal RD_EN_DELAY is deasserted.

FIG. 3(c) is a flowchart of one embodiment of a method implemented by the read head timing adjustment control system for adjusting the timing of the read head with respect to the reference index mark. When a central control packet is detected by the read logic in step 302, the read logic detects an index mark signal INDEX_MARK. This triggers the start of a timer in step 304. The read head timing adjustment control system 300 then looks for the next detection of a central control packet in step 306. Upon detection of the central control packet, the timer is stopped in step 308. In step 310, the timer value $t_{DET}$ is compared to the calibrated value $t_{CAL}$. If $t_{DET}$ is greater than the calibrated value $t_{CAL}$, the read head timing adjustment control system 300 increases $t_{ADJ}$ in step 312 by the difference in time between $t_{CAL}$ and $t_{DET}$. If $t_{DET}$ is less than the calibrated value $t_{CAL}$, the read head timing adjustment control system 300 decreases $t_{ADJ}$ in step 314 by the difference in time between $t_{CAL}$ and $t_{DET}$.

The method of the invention can also be used to calibrate the timing signal $t_{CAL}$ at the factory. This is performed by measuring the time between the index mark INDEX_MARK and the detection of the next central control packet 30 using a known good tape and setting the value of $t_{CAL}$ to the measured time, or to an average time taken over several tracks.

Figure 4:
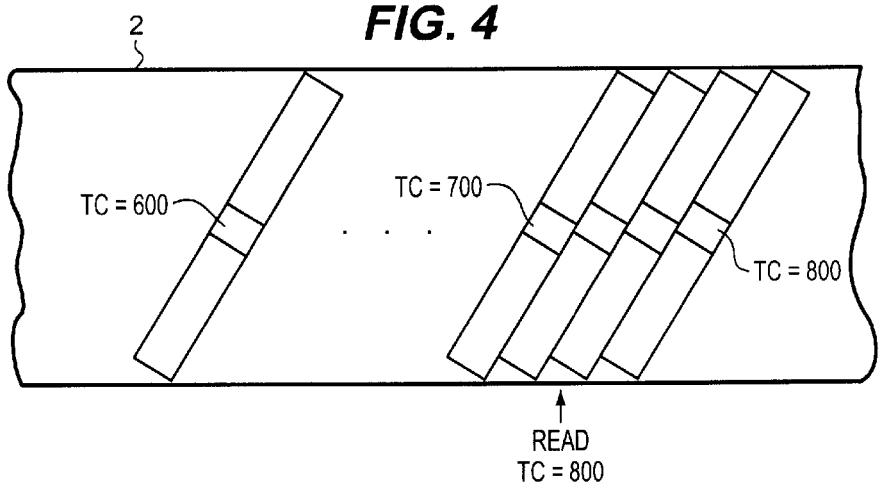
FIG. 4 is a diagram of a tape illustrating the use of a central control packet for correlating the reel tach count with the linear position of the tape.

FIG. 4 is a diagram illustrating a second use of a central control packet 30 for correlating the reel tach count with the linear position of the tape. As previously described, due to variation in tape winding tension around the reels between normal speed tape transport such as normal reads and writes and high speed tape transport operations such as rewinds and high-speed searches, the reel tach count does not consistently reflect the same reel tach count for a given linear position of the tape. In accordance with the invention, each central control packet 30 that is written to the same location on tape includes a tape count field 32. Tape count field 32 contains the original reel count of the drive at the time the track associated with the central control packet 30 was originally recorded. According to the invention, whenever a central control packet 30 is read, either during a normal speed read or during a high-speed search operation, the actual reel tach count is overwritten with the tape count 32 if the counts do not match. This method synchronizes the actual reel count to the reel count during the original recording of the tracks on the tape.

Figure 5:
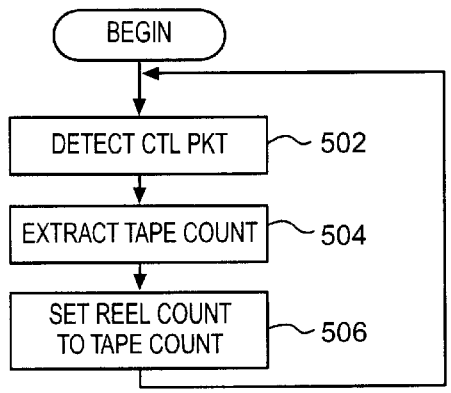
FIG. 5 is a flowchart of one embodiment of a reel tach synchronization method.

FIG. 5 is a flowchart of one embodiment of a method for synchronizing the actual reel count to that of the drive when the tracks were originally recorded to the tape. According to the method, a central control packet 30 is detected in step 502. The tape count 32 is extracted from the central control packet 30 in step 504. The actual reel count is overwritten with the value of the tape count 32 in step 506. The synchronization of the actual reel tach count to that of the recorded data allows the current reel tach count to be correlated to the linear position of the tape for use in search operations.

Figure 6:
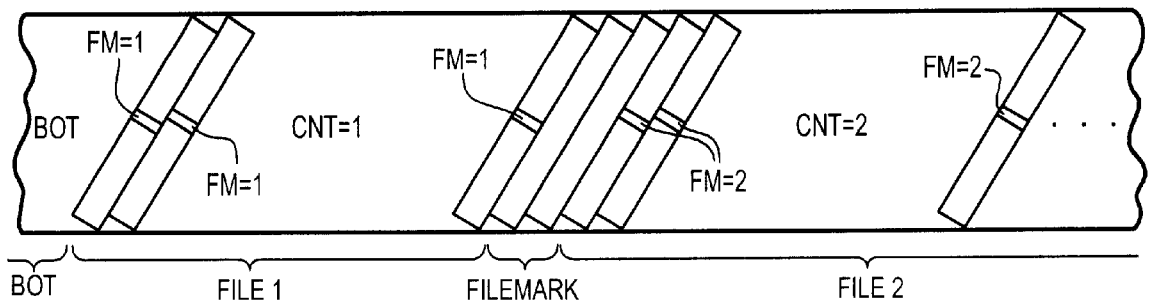
FIG. 6 is a diagram of a tape illustrating the use of a central control packet for correlating the current position of the tape to the filemark number.

FIG. 6 is a diagram illustrating the use of a central control packet 30 for correlating the current position of the tape to the filemark number. In accordance with the invention, each central control packet 30 that is written to the same location on tape which allows one out of every several to be read during high-speed operations, includes a filemark (FM) count field 34. FM count field 34 contains the number of the current filemark count recorded up to the current position of the tape 2. According to the invention, whenever a central control packet 30 is read, either during a normal speed read or during a high-speed search operation, the filemark count field is read to assist in locating the desired file. This improves the speed at which a given file may be located by informing the high-speed search logic of the current file number even if a set of filemarks pass undetected by the read logic during the high-speed search. Accordingly, high-speed search logic may slow the transport speed as it detects the approach of a desired filemark, and, if the filemark is missed, allows earlier detection of the missed filemark.

Figure 7:
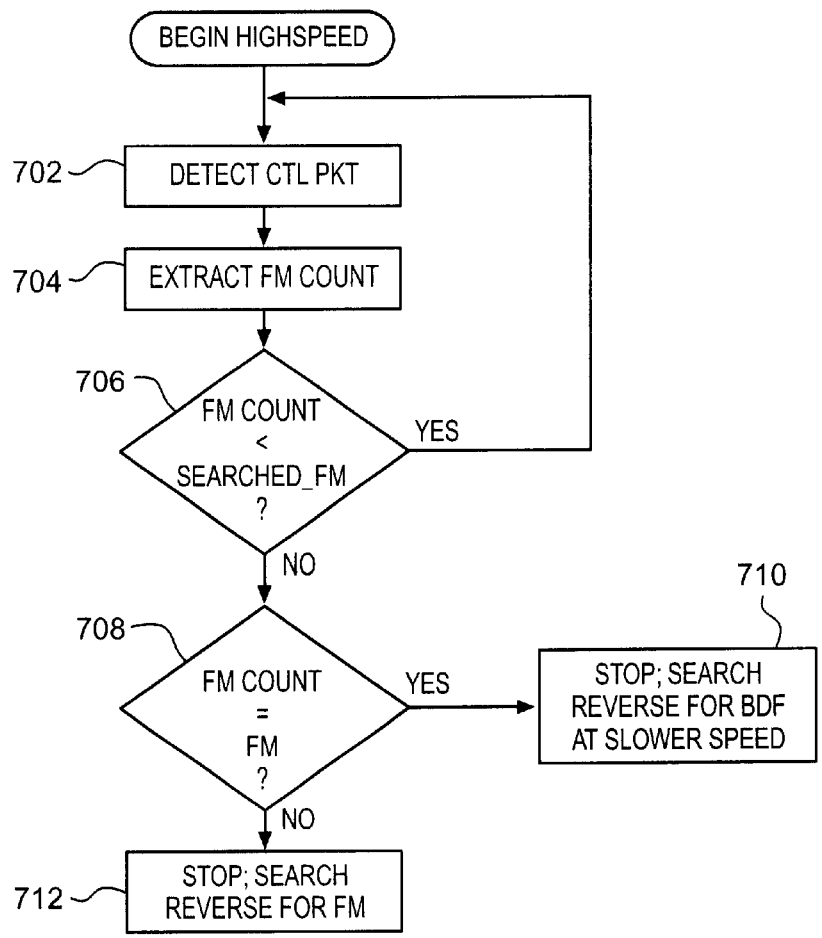
FIG. 7 is a flowchart of one embodiment of a method for monitoring the position of the tape in terms of the current filemark.

FIG. 7 is a flowchart of one embodiment of a method for monitoring the position of the tape in terms of the current filemark. According to the method, a central control packet 30 is detected in step 702. The filemark count 34 is extracted from the central control packet 30 in step 704. The filemark count 34 is compared to the desired filemark in step 606. If the filemark count 34 is less than the desired filemark, steps 702 through 706 are repeated. If the filemark count 34 matches the desired filemark, as detected in step 708, tape transport is stopped and commenced in reverse at a slower speed to look for the beginning of the file in step 710. If the filemark count 34 is greater than the desired filemark count as detected in step 712, tape transport is stopped and commenced in reverse, and steps 702 through 706 are repeated.

It is clear from the above description that the present invention provides several advantages over the prior art. The use of a central control packet that is written on every track at the same location allows the packet to be detected during normal read operations and once per several tracks during high speed operations. This allows tape positioning information to be stored and extracted from the central control packets to assist in various tape positioning operations. First, the position of the central control packet can be monitored to assist in assuring that the timing of the read head over the track is within predetermined specifications to ensure that the entire track is always seen by the read head. Secondly, the reel tach count can be stored in the central control packet when the track is recorded, which allows the drive to synchronize the actual reel tach to the reel tach of the originally recorded tracks. The reel tach synchronization method provides a correlation between the reel tach count and the linear position of the tape for use by search operations. Finally, the filemark count may be stored in the central control packet to assist in the detection of the current filemark by high-speed search logic.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for adjusting a timing of an enablement of a read head in a tape drive, said tape drive reading a tape comprising a plurality of recorded tracks, comprising:

detecting a reference index mark;

detecting a central control packet, said central control packet being recorded at an identical position on each of said plurality of recorded tracks;

measuring a relative time between said detection of said reference index mark and said detection of said central control packet; and adjusting said timing of said enablement of said read head based on said relative time.

2. A method in accordance with claim 1, wherein only one of said central control packet exists on any given track.

3. A method in accordance with claim 1, comprising:

delaying said enablement of said read head by an amount of time equal to said relative time.

4. A method in accordance with claim 1, comprising:

indicating if said relative time is greater than a predetermined time threshold.

5. A method for adjusting a reel tach in a tape drive, said reel tach comprising a function of a supply reel tach count from a supply reel and a takeup reel count from a takeup reel, comprising:

detecting a central control packet, said central control packet being recorded at an identical position on each of a plurality of recorded tracks on a tape being read by said tape drive, said central control packet comprising a recorded reel count representing said reel tach count at the time said central control packet was recorded on said tape;

extracting said recorded reel count; and setting said reel count to said recorded reel count.

6. A method for monitoring a filemark position in a tape drive, said tape drive reading a tape comprising a plurality of recorded tracks, comprising:

detecting a central control packet, said central control packet being recorded at an identical position on each of said plurality of recorded tracks, said central control packet comprising a recorded filemark count, said recorded filemark count representing a number of filemarks recorded on said tape up to a current position of said tape; and extracting said recorded filemark count.

7. A method in accordance with claim 6, comprising:

signaling said recorded filemark count to a file search algorithm.

8. A method for monitoring and/or adjusting the positioning of a magnetic medium in a magnetic reproduction device, said magnetic medium comprising a plurality of tracks, each track comprising a plurality of digital track packets each of which comprises at least a track packet type field comprises one of a plurality of track packet types including at least a central control packet type and a data type, and wherein when said track packet type field comprises said central control packet type, said track packet data field of said track packet comprising at least a digital positioning parameter that represents a value of a positioning parameter of said magnetic medium when said track packet was recorded on said magnetic medium; and wherein all track packets having a track packet type field comprising said central control packet type are recorded at an identical position along said plurality of recorded tracks on said magnetic medium, said method comprising:

detecting a track packet;

extracting a track packet type from said track packet type field associated with said track packet;

if said track packet type is a central control packet type:

extracting said digital positioning parameter from said track packet data field of said track packet; and adjusting said positioning parameter of said magnetic medium based on said extracted digital positioning parameter.

9. A method in accordance with claim 8, wherein:

said digital positioning parameter is a recorded filemark count, said recorded filemark count representing a number of filemarks recorded on said tape up to a current position of said tape.

10. A method in accordance with claim 8, wherein:

said digital positioning parameter is a recorded reel tach count, said recorded reel tach count representing a reel tach count at the time said central control packet was recorded on said tape.

11. A method for allowing monitoring and/or adjusting the positioning of a magnetic medium in a digital reproduction device, said magnetic medium comprising a plurality of tracks, each track comprising a plurality of digital track packets each of which comprises at least a track packet type field and a track packet data field, wherein said track packet type field comprises one of a plurality of track packet types including at least a central control packet type and a data type, and wherein when said track packet type field comprises said central control packet type, said track packet data field of said track packet comprising at least a digital positioning parameter that represents a value of a positionin parameter of said magnetic medium when said track packet was recorded on said magnetic medium; and wherein all track packets having a track packet type field comprising said central control packet type are recorded at an identical position along said plurality of recorded tracks on said magnetic medium, said method comprising:

recording a central control packet at said identical position on each track recorded onto said magnetic medium, each said central control packet comprising a track packet having a track packet type field set to said central control packet type and a track packet data field comprising at least a digital positioning parameter readable by said digital reproduction device related to magnetic medium positioning control parameters.

12. The method of claim 11, wherein:

said central control packet comprises a recorded filemark count, said recorded filemark count representing a number of filemarks recorded on said magnetic medium up to a current position of said tape.

13. The method of claim 11, wherein:

said central control packet comprises a recorded filemark count, said recorded reel tach count representing a reel tach count at the time said central control packet was recorded on said magnetic medium.

14. The method of claim 11, wherein:

said central control packet is positioned a relative distance from a reference index mark generated by said digital reproduction device;

wherein said digital reproduction device may measure said relative distance and adjust a timing of an enablement of a read head over said magnetic medium based on said relative distance.

15. A magnetic medium for a digital reproduction device comprising:

a plurality of tracks recorded on said magnetic medium, each comprising:

a track type field comprising one of a plurality of track packet types, said plurality of track packet types including at least a central control packet type and a data type; and a track packet data field, wherein when said track packet type field comprises said central control packet type, said track packet data field comprises at least a digital positioning parameter that represents a value of a positioning parameter of said magnetic medium when said respective track packet was recorded on said magnetic medium;

wherein all track packets having a track packet type field comprising said central control packet type are recorded at an identical position along said plurality of recorded tracks on said magnetic medium.

16. A magnetic medium in acordance with claim 15, wherein:

each said central control packet comprises a recorded filemark count, said recorded filemark count representing a number of filemarks recorded on said magnetic medium up to a current position of said magnetic medium.

17. A magnetic medium in accordance with claim 15, wherein:

each said central control packet comprises a recorded reel tach count, said recorded reel tach count representing a reel tach count at the time said central control packet was recorded on said magnetic medium.

18. A magnetic medium in accordance with claim 15, wherein:

each said central control packet is positioned a relative distance from a reference index mark generated by said digital reproduction device;

wherein said digital reproduction device measures said relative distance and adjust a timing of an enablement of a read head over said magnetic medium based on said relative distance.

* * * * *